Jan. 27, 1959         G. F. OAKLEY         2,870,722
ANCHOR FOR LADING STRAPS AND THE LIKE
Filed July 19, 1954         7 Sheets-Sheet 1

INVENTOR
GILBERT F. OAKLEY
BY
ATTORNEY

Jan. 27, 1959　　　G. F. OAKLEY　　　2,870,722
ANCHOR FOR LADING STRAPS AND THE LIKE
Filed July 19, 1954　　　　　　　　　7 Sheets-Sheet 2

INVENTOR
GILBERT F. OAKLEY
BY
ATTORNEY

Jan. 27, 1959  G. F. OAKLEY  2,870,722
ANCHOR FOR LADING STRAPS AND THE LIKE
Filed July 19, 1954  7 Sheets-Sheet 3

INVENTOR
GILBERT F. OAKLEY
BY
ATTORNEY

Jan. 27, 1959   G. F. OAKLEY   2,870,722
ANCHOR FOR LADING STRAPS AND THE LIKE
Filed July 19, 1954   7 Sheets-Sheet 5

INVENTOR
GILBERT F. OAKLEY
BY
ATTORNEY

Jan. 27, 1959   G. F. OAKLEY   2,870,722
ANCHOR FOR LADING STRAPS AND THE LIKE
Filed July 19, 1954   7 Sheets-Sheet 7

INVENTOR
GILBERT F. OAKLEY
BY
ATTORNEY

# United States Patent Office 2,870,722
Patented Jan. 27, 1959

2,870,722

ANCHOR FOR LADING STRAPS AND THE LIKE

Gilbert F. Oakley, Chicago, Ill., assignor to MacLean-Fogg Lock Nut Company, Chicago, Ill., a corporation of Illinois Application July 19, 1954, Serial No. 444,110

4 Claims. (Cl. 105—369)

This invention relates to an improved anchor for lading straps and the like, and more particularly to such an anchor embodying a combination of surfaces and portions which facilitate its application to various types of railway cars and various mountings on such cars for the securement of objects of lading by means of straps or ties attachable to the anchor.

It is a general object of the invention to provide an anchor for lading straps and the like which is rigid and strong and which has surfaces and portions so constructed and related that it is adapted to mounting in various ways on different types of railway freight cars.

It is a more specific object of the invention to provide an improved lading strap anchor which is particularly designed and shaped for securement to different types of railway freight cars in various ways and in various positions, and which, after securement, is generally integral with the car underframe structure.

It is a further object of the invention to provide a lading strap anchor which is suitable for use with railway freight cars of various designs and constructions including those with either wood or metal floors, and which may be located and aligned either laterally or longitudinally of such railway cars, thereby making anchor points available throughout the railway car floor area for greater convenience and efficiency in obtaining compact and well-secured freight loadings.

Another object of the invention is the provision of an improved lading strap anchor which is effectively and relatively easily applied to a railway freight car, and which by its adaptability enables its position or angle of securement to underframe members of the railway car to be determined largely by the direction of extension desired for the lading straps to be used for the safe securement of objects of lading being transported on the railway car.

A further object of the invention is the provision of an improved anchor for lading straps and the like which has suitability for utilization with various types of auxiliary fittings such as adaptors and supports in the installation and use of the anchor on railway cars, thereby to enlarge its versatility of application and further insuring a strong and rigid securement to various supporting members of the railway car at desired locations.

It is another object of the invention to provide a lading strap anchor which has multi-directional characteristics, and which enables a plurality of lading straps or ties to be attached to a single anchor and to be utilized without kinking, twisting, being torn at the edges, or subjected to other injurious conditions.

It is a further object of the invention to provide an anchor for lading straps and the like which may be secured to the railway car in a manner that facilitates attachment of the lading straps and ties to the anchor and that enables the anchor point to maintain itself in a clean and usable condition at all times.

It is also an object of the invention to provide an improved anchor for the lading straps and the like which by its many possible applications to railway freight cars and the like, eliminates the need for many different types of anchors, thereby making possible lower inventories of anchor parts and reduced time and expense in supplying and installing lading strap anchors on railway cars.

Other objects and advantages of the invention will be apparent from the following description and the accompanying drawings in which similar characters of reference indicate similar parts throughout the several views:

Referring to the seven sheets of drawings.

Having reference to the accompanying drawings wherein exemplary embodiments of my invention are disclosed for illustrative purposes, it will be seen that my anchor 10 for lading straps and the like is of unusual design in that it combines a tie post portion 11, formed so as to afford secure and convenient attachment of lading straps and ties thereto, with shaped wing portions 12 having a structure adapted to facilitate various securements of the anchor 10 to a railway car. The tie post portion 11 of my anchor is of elongated shape and is integral with the shaped wing portions 12 at each end thereof, said tie post portion being adapted to engage lading straps and ties having looped ends affixed thereto for retention of objects of lading transported on the railway car.

The tie post portion has lower and upper longitudinally convex edge surfaces 13 and 14, which edge surfaces are also smoothly and convexly curved and rounded in their lateral contours. When such surfaces are engaged by one or more lading straps or ties, the straps are stressed principally at their midportions rather than at their edges, and are consequently less likely to tear or break. The lading straps can extend from the post portion in a plurality of angularly varied directions without being kinked or abruptly bent, so as to be weakened. The lading straps have less tendency to slip longitudinally of the post portion when extended therefrom at angles which are longitudinal to the post position of the anchor. Furthermore, the opposed relationship of the upper and lower convexly curved edges of the tie post portion, as well as the longitudinally and laterally convex curvature of an intervening inner face or surface 15, permit the anchor to be mounted in a plurality of positions relative to a supporting structure, while presenting convexly rounded surfaces for engagement with lading straps or ties. In opposed relationship to the longitudinally and laterally convex inner face or surface 15, the tie post portion 11 has a substantially flat surface 9 which serves as the outer face of the anchor.

The tie post portion defines in its central area an elongated opening 16 which extends lengthwise of the tie post portion and which has a restricted center space 17. The elongated opening 16 is of a size for the convenient insertion and containment of relatively narrow lading straps or ties therein. The provision of the restricted center space results in longitudinally convex edges 18 which serve a function similar to that of the longitudinally convex edges 13 and 14 on the outside of the lading strap anchor. Generally, the surfaces of the tie post portion are rounded, as at the corners, to facilitate tightening of the lading straps and to prevent injury thereto.

Figure 1:
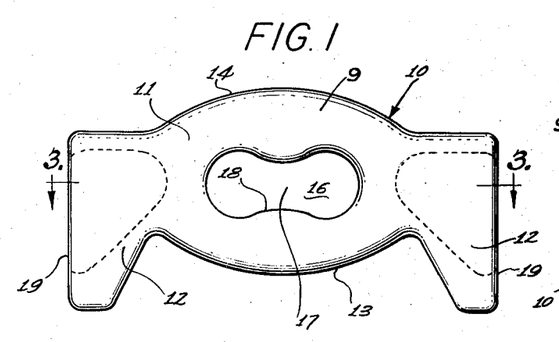
Fig. 1 illustrates a lading strap anchor embodying my invention, the view showing the structure in front elevation and in a form adapted to be utilized for application to any one of different types of railway freight cars for the attachment of lading straps or ties thereto.
Figure 2:
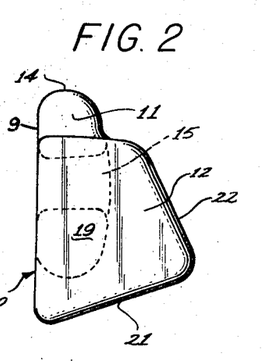
Fig. 2 is a side view of the anchor for lading straps and the like which is shown in Fig. 1.
Figure 3:
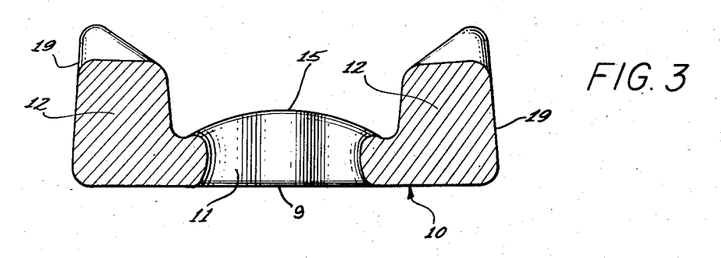
Fig. 3 is a sectional view taken substantially on a line 3—3 of Fig. 1, in the direction of the arrows, and indicates the shapes of portions of the anchor at such sectional position.
Figure 4:
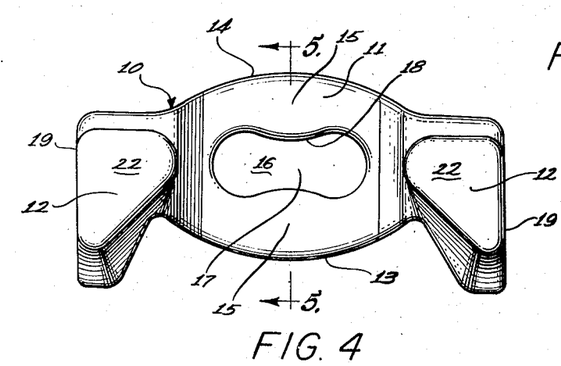
Fig. 4 is a rear elevational view of the anchor for lading straps and the like which is shown in Fig. 1.
Figure 5:
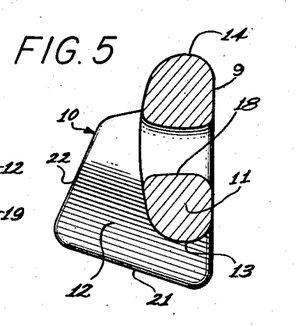
Fig. 5 is a side sectional view taken substantially on a line 5—5 of Fig. 4, in the direction of the arrows, and particularly indicates the cross-sectional configuration of the tie post portions of my lading strap anchor.

The shaped wing portions 12 constitute end supports for the tie post portion 11 when my lading strap anchor is secured to a railway car. Each of the wings 12 projects from the tie post portion in a plane generally perpendicular to the length of the tie post portion, with each preferably having the general configuration of a trapezium as viewed from an end of the anchor, as shown in Fig. 2, and a general triangular side configuration, as shown in Fig. 4. Certain of the outer edges and the relatively flat end surfaces of the wing portions may be considered as support contacting areas in that they are particularly adapted for engagement with supporting structures in different mounting positions and when carried by various structural members of a railway car. Thus, end surfaces 19, bottom edges 21, and side edges 22 of the shaped wing portion 12 are especially suited to serve as contact areas for support of the anchor with various anchor supporting members. Such contact areas of the wing portions are appropriately spaced from each other and from the tie post portion so as to provide a spaced relationship between the tie post portion and the particular railway car member to which the anchor is attached.

Securement of my lading strap anchor to a railway car at any one of the contact areas described will provide a suitable open space between the tie post portion and its supporting member for passage of the lading straps or ties, and will cause the tie post portion to be disposed for convenient and effective extension of the lading straps from the anchor to the various objects of lading being transported on the railway car. In selecting the particular contact area of the shaped wing portion to be used for engagement with the railway car, consideration is given to the ease and convenience in effecting a secure and rigid mounting of the anchor to the railway car and having reference to the shape and position of the anchor supporting member and also to the intended direction of extension of the lading strap from the anchor to the object of lading which is to be tied down.

My lading strap anchor with the generally trapezium shaped wing portions 12 has versatility and adaptability in its use with railway cars. Thus, it may be installed in existing railway car structures at various desired points throughout the floor area, or it may be included in the design and construction of new cars. Further, it is particularly suitable for mounting on conventional underframe members such as side sills, center sills, end sills, bolsters, crossbearers and floor stringers, or on various parts associated with those members, such as cover plates, side sill webs, and top angles. Moreover, various types of auxiliary fittings, such as U-strap supports or suitably shaped adaptor brackets, may be used for more effective securement and positioning of my anchor to a railway car as will be more fully hereinafter described.

Figure 13:
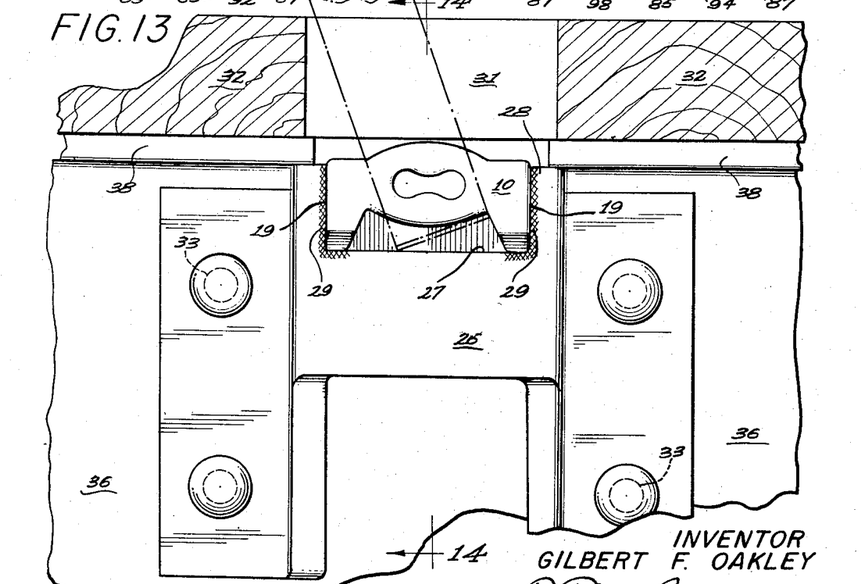
Fig. 13 is a fragmentary elevational view showing the mounting of my lading strap anchor to a stake pocket of a railway flat car and illustrating by the dot and dash lines one manner of attachment of a lading strap to the anchor.
Figures 14, 15, 25, 26, 27:
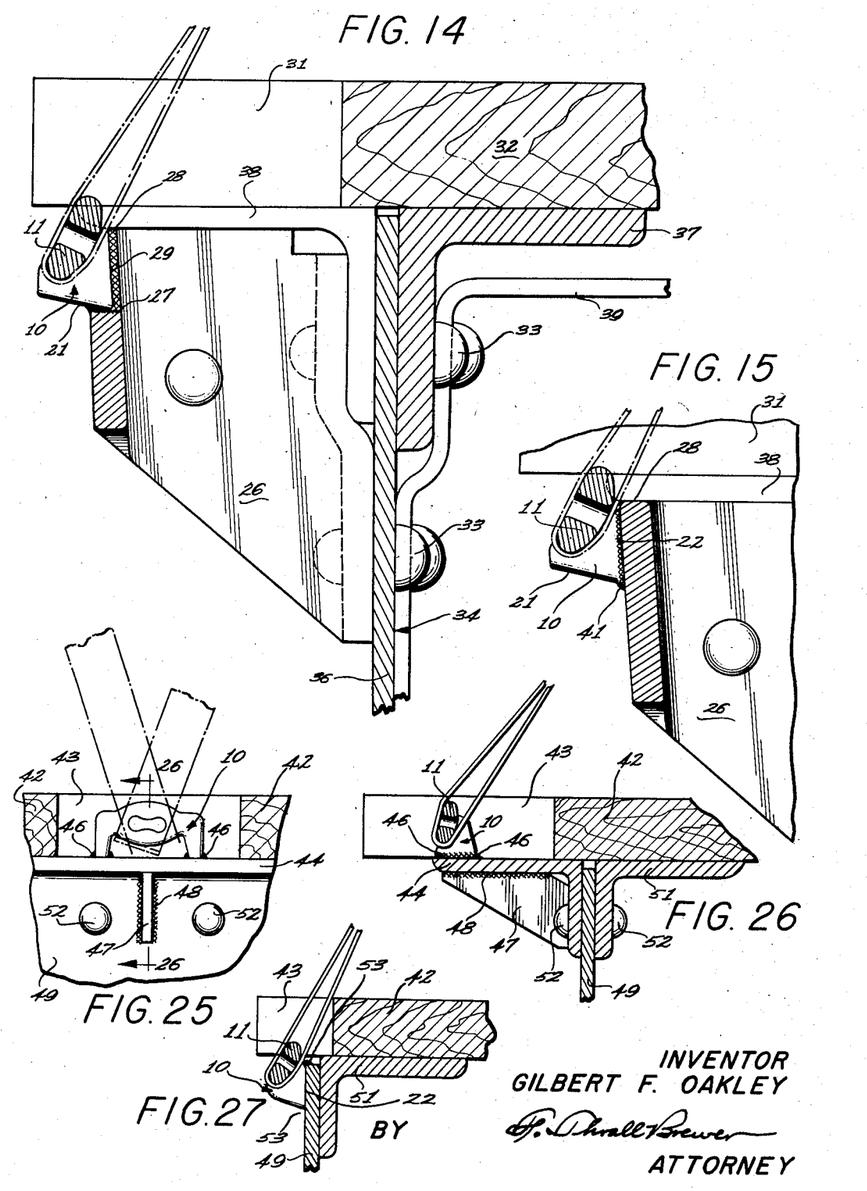
Fig. 14 is a fragmentary, sectional view taken substantially on a line 14—14 of Fig. 13, in the direction of the arrows, and further illustrating the mounting of my lading strap anchor to a flat car stake pocket.
Fig. 15 is a fragmentary elevational view similar to that of Fig. 14, showing an alternative manner of attachment of my anchor to a stake pocket of a railway flat car.
Fig. 25 is a fragmentary elevational view showing the application of my anchor to a side sill top angle of a railway car, and indicating by the dot and dash lines the application of lading straps to the anchor.
Fig. 26 is a fragmentary sectional view taken substantially on a line 26—26 of Fig. 25, in the direction of the arrows, and further showing the securement of my improved anchor to a top angle of the side sill of a railway car.
Fig. 27 is a fragmentary sectional view similar to that of Fig. 26, illustrating an alternative type of mounting of my anchor on a railway car side sill in which the anchor is secured to the side sill web.

In utilizing my lading strap anchor with a railway car or its underframe structure without the use of auxiliary fittings, the anchor 10 may be supported on a metal stake pocket 26 of a railway flat car, as shown in detail in Figs. 13 and 14. Recessed mounting of my anchor to the metal stake pocket is effected by securing the anchor within a suitably shaped recess 27 in the upper margin 28 of the stake pocket by welds 29. The contact areas provided by end surfaces 19 of the anchor engage the stake pocket at the ends of the recess, so that the tie post portion 11 is positioned upwardly and outwardly with respect to the recess 27 with the tie post portion sloping inwardly toward the car. As thus arranged, lading straps attached to the tie post portion may extend upwardly through a stake pocket opening 31 in the wood floor 32 of the railway flat car. Such attachment of my disclosed anchor does not, of course, restrict the function of the stake pocket when the anchor is not in use. This type of anchor mounting provides a strong and rigid anchor point inasmuch as the stake pocket is secured in place by rivets 33 on a railway car side sill 34, the side sill conventionally comprising a side sill center web 36 interposed between inner and outer top angles 37 and 38, respectively, and supporting an underframe crosstie 39.

An alternative manner of mounting my universal anchor 10 to a metal stake pocket 26 of a railway flat car as shown in Fig. 15, is by positioning the anchor so that contact areas provided by side edges 22 engage the outer surface of the stake pocket and are secured thereto by welds 41. In such mounting, the position of the tie post portion of the anchor is upwardly and outwardly with respect to the stake pocket as in the case of the recess mounting, and the tie post portion slopes inwardly toward the car. Lading straps attached to the anchor similarly extend upwardly through stake pocket opening 31 in the car flooring. Anchor points utilizing the anchor on stake pockets may be located at spaced intervals along each side of the railway flat car for rapid and convenient tying down of objects of lading by straps or ties extending laterally of the car floor.

Other manners of mounting my anchor 10 to a railway car underframe without the use of auxiliary fittings are shown in Figs. 25 and 26 and in Fig. 27. As shown in Figs. 25 and 36, the anchor may be affixed to a railway car side sill at various desired points along each side of the car floor. In such mounting, laterally extending floor boards 42 are cut off at their ends to provide anchor recesses 43 and to expose portions of the side sill for securement of the anchors thereto. As illustrated, the anchor 10 is welded at 46 to the outside top angle 44 of the railway car side sill, using the contact areas provided by bottom edges 21 of the anchor for engaging the upper angle surface, so that the tie post portion 11 is positioned upwardly and outwardly of the side sill. For reinforcement of the side sill top angle at the anchor position, a gusset plate 47 is rigidly secured to the under and outer surfaces of the top angle as by welds 48. The use of the gusset plate rigidifies and strengthens the side sill top angle at the position of the anchor. In addition to the top angle 48, the side sill shown has a web plate 49 and inner top angle 51 which are secured together and to the outer top angle by rivets 52.

An alternative mounting of my anchor on a railway car side sill is shown in Fig. 27, this being of advantage when the side sill does not include an outer top angle which provides a shelf to which anchors can be attached. The anchor 10 is welded at 53 and along its opposite ends directly to the side sill center web 49, with the contact areas provided by side edges 22 of the anchor engaging the outer surface of the center web, so that tie post portion 11 is positioned upwardly and outwardly of the side sill. Rigidity and strength of the anchor point is maintained by the reinforcing engagement of inner top angle 51 with the side sill center web. Lading straps attached to the tie post portion of the anchor extend upwardly through anchor recess 43 defined by adjacent flooring elements and inwardly toward the lading on the railway car floor.

Figures 18, 19:
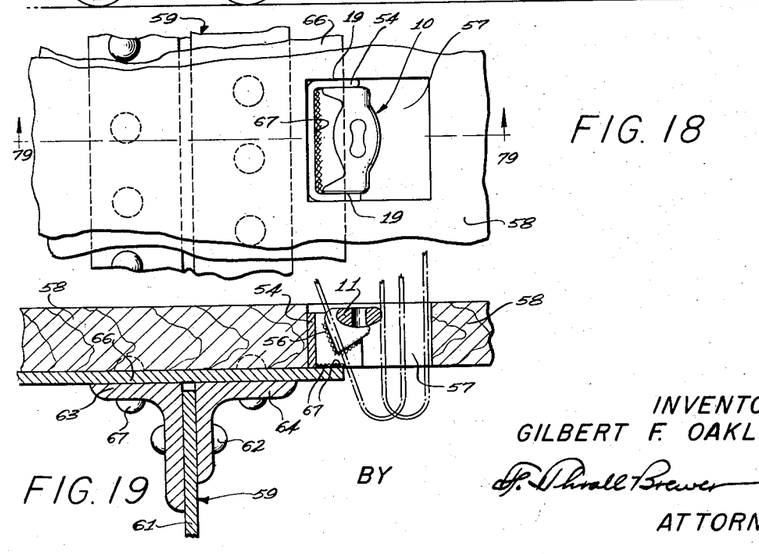
Fig. 18 is a fragmentary top plan view of my lading strap anchor as applied interiorly of the ends and sides of a car floor and attached to a center sill cover plate of a railway car underframe.
Fig. 19 is a fragmentary sectional view taken substantially on a line 19—19 of Fig. 18, in the direction of the arrows, and indicating by the dot and dash lines a manner of attachment of lading straps to the anchor.

A rigid and strong anchor mounting is provided by utilizing a U-strap support in attaching my disclosed lading strap anchor to various underframe members of a railway car. When applied to a railway car center sill, as shown in Figs. 18 and 19, the anchor 10 is affixed at the contact areas provided by its end surfaces 19 to a U-strap support 54 as by welds 56. The anchor and U-strap support are then mounted in a suitably shaped anchor recess 57 in wooden floor boards 58 with the tie post portion 11 at a suitable position for the attachment of lading straps thereto. The anchor recess in the disclosed installation, is located adjacent to a railway car center sill 59 which comprises a center sill center web 61 riveted at 62 to top angles 63 and 64 and carrying a center sill cover plate 66. The anchor recess exposes a portion of the center sill cover plate to which the U-strap support 54 is secured by welding at 67. The U-strap support utilized with my anchor is formed from a relatively heavy metal plate with the dimensions of its web and flange determined to fit those of the lading strap anchor 10, and with its depth being sufficient to extend from the underframe structure through the flooring elements 58, so that the tie post portion of the anchor is immediately below the surface of the railway car floor.

Figure 20:
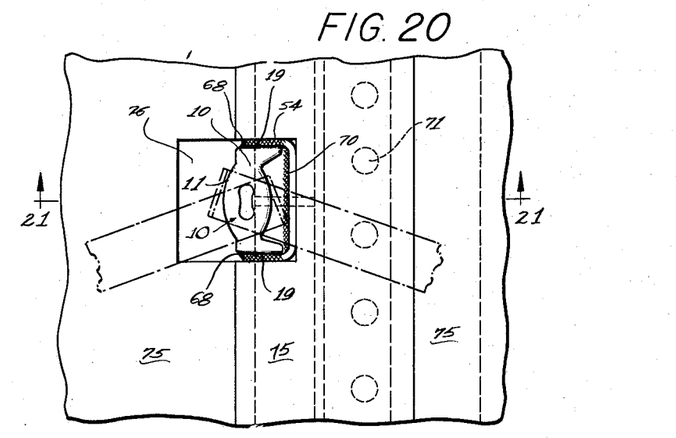
Fig. 20 is a fragmentary top plan view of my lading strap anchor mounted interiorly of the sides and ends of a car floor and secured to a cross-bearer cover plate of a car underframe by means of a U-strap support, and indicating by the dot and dash lines the attachment of lading straps thereto.
Figures 21, 22, 23, 24:
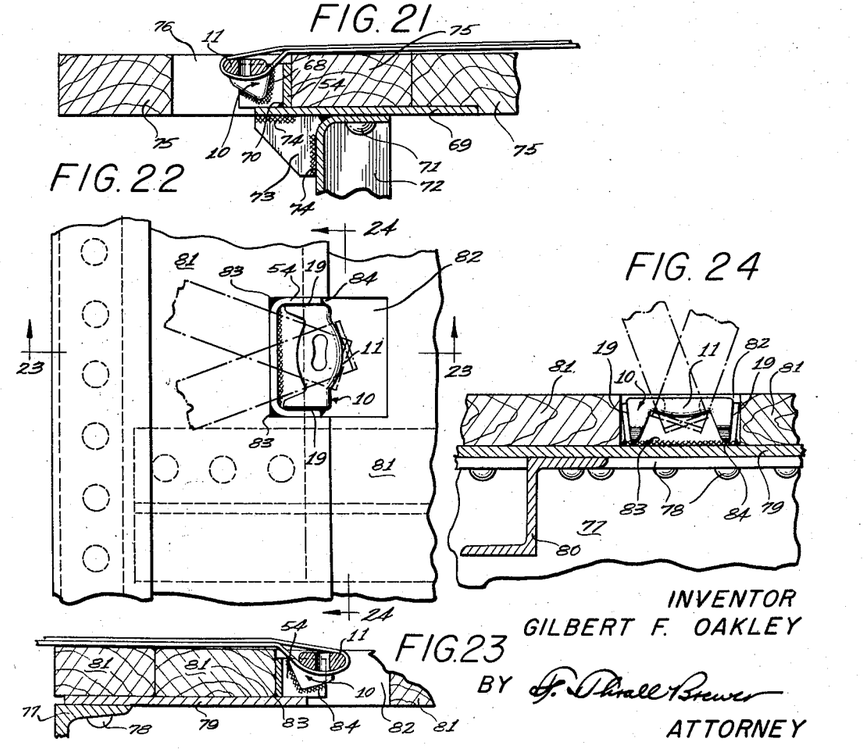
Fig. 21 is a fragmentary section view taken substantially on a line 21—21 of Fig. 20, in the direction of the arrows, and further showing the securement of the anchor to a crossbearer cover plate of a railway car.
Fig. 22 is a fragmentary, top plan view illustrating a type of mounting in which my universal anchor is applied to an end sill cover plate of a railway car through a U-strap support, and indicating by the dot and dash lines the engagement of lading straps to the anchor.
Figs. 23 and 24 are fragmentary sectional views taken substantially on a line 23—23 and a line 24—24, respectively, of Fig. 22, in the direction of the arrows, and further showing the application of my anchor to an end sill cover plate of a railway car.

Another type of mounting utilizing a U-strap support is shown in Figs. 20 and 21, in which my lading strap anchor is attached to a crossbearer cover plate of a railway car. In this case, the anchor 10 is secured to a U-strap support 54 as by welds 68 at the contact areas of the lading strap anchor provided by its end surfaces 19, the anchor being positioned with respect to the U-strap support so that the tie post portion is located adjacent to the upper surface of the railway car floor. The U-strap support is welded at 70 to a crossbearer cover plate 69 which, in turn, is riveted at 71 to crossbearer 72. The section of the crossbearer cover plate to which the U-strap support is secured is reinforced by a suitable gusset plate 73 welded at 74 to the crossbearer cover plate and to the crossbearer. The anchor and the U-strap support are contained within an appropriate anchor opening 76 defined by wood flooring 75, such anchor opening, of course, exposing the portion of the crossbearer cover plate to which the U-strap support is secured. As the crossbearers extend laterally of the railway car at spaced intervals along its length, anchor positions afforded by my anchors which are supported on crossbearer members of a railway car, in the manner shown, also extend laterally of the railway car, and are used primarily for freight requiring lading straps or ties directed longitudinally of the railway car. Several rows of such anchor points may, of course, be provided along the length of the railway car.

A further manner of mounting my anchor to underframe members of a railway car utilizing a U-strap support is shown in Figs. 22, 23, and 24, in which anchor 10 is affixed to an end sill cover plate. In this underframe structure, a railway car end sill 77 has riveted thereto at 78 an end sill cover plate 79, the end sill extending laterally of the car and perpendicular to a floor stringer 80. One the end sill cover plate are floor boards 81 extending across the railway car and forming its floor surface. A suitably shaped anchor recess 82 is provided in the floor surface of the railway car by cutting away a portion of the flooring elements adjacent to and partially over the end sill cover plate. Such anchor recess is preferably made at a juncture of the flooring elements so as to minimize weakening of the floor surface at the anchor position. The U-strap support is secured to the end sill cover plate by welding at 83; the anchor being welded to the U-strap support at 84, with the end surfaces 19 of the anchor in contact with the U-strap and the tie post 11 adjacent to the top surface of the railway car floor. A relatively large portion of the anchor recess 82 is open at the bottom for facilitating convenient attachment of lading straps to the anchor and for self cleaning of the recess. When my anchor is thus mounted to an end sill cover plate, a desired number of anchor positions may be provided at spaced intervals across the railway car at either end.

My lading strap anchor may also be used with adaptor brackets of various shapes for special types of mountings such as, for example, where the lading strap anchor is to be secured to metal flooring elements of a railway car. This is of advantage in that it enables anchor positions to be situated on the floor surface without regard to the location of the various members of the underframe structure. Suitably shaped adaptor brackets may be used in connection with such mountings to impart greater rigidity and strength to the mounted anchor structure.

Figure 9:
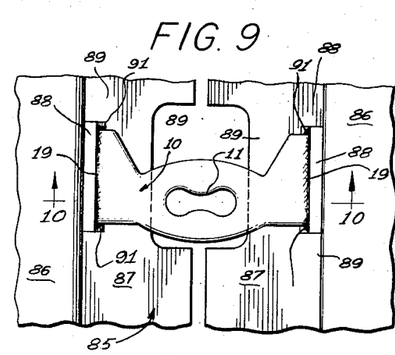
Fig. 9 is a fragmentary top plan view of my lading strap anchor of the type shown in Fig. 1, and depicts the application of that anchor to metal flooring elements of a railway flat car.
Figure 10:
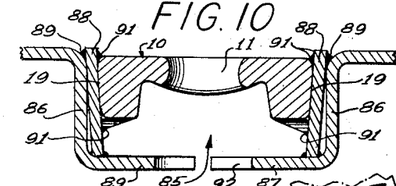
Fig. 10 is a fragmentary sectional view taken substantially on a line 10—10 of Fig. 9, in the direction of the arrows, and further illustrating details of the application of my improved anchor to metal flooring elements of a railway flat car.

A railway car metal floor is conventionally comprised of pressed sheet steel flooring sections of convenient width which extend laterally of the car and are secured to the car underframe structure. In employing my anchor with such a metal flooring as shown in Figs. 9 and 10, two of the metal flooring elements 86 are provided with outturned bottom flanges 87, so as to provide an anchor recess 85 extending across the railway car floor. Each of the flooring elements 86 has the lower horizontal flange 87 extending toward the corresponding flange of the adjacent flooring element and spaced therefrom, whereby the flanges form the bottom of the anchor recess. To insure rigid and strong securement of the anchor, adaptor plates 88 are utilized at opposite ends of the anchor, which brackets are of relatively heavy strap metal in rectangular shape having a height approximately the depth of the floor channels. The adaptor plates are mounted in the anchor recess oppositely of each other alongside and parallel to the vertical web of each of the adjacent floor channels and secured thereto by welds 89. My anchor is secured to the adaptor brackets by welds 91 and with end surfaces 19 utilized as the contact areas. Edges of flanges 87 of the adjacent flooring elements 86 are preferably cut away beneath the anchor tie post portion to define an opening 92 for facilitating attachment of lading straps to the anchor.

In this manner of securement of my universal lading strap anchor to metal flooring of a railway car, the anchor tie post portion is disposed longitudinally of the car which is advantageous when the lading straps extend in a direction lateral to the railway car. Rows of anchor points may be provided throughout the length of the railway car as desired. Further rigidity and strength is imparted to the anchor mounting by the triangular arrangement obtained when the upper edge of the adaptor plate 88 is secured to the upper portion of the vertical web of the flooring element 86 and when the lower edge of the adaptor plate is spaced somewhat from the lower portion of such vertical web and is secured to the flange 87.

Figure 11:
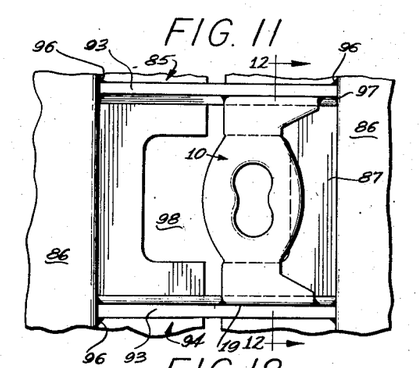
Fig. 11 is a fragmentary top plan view of another modified type of mounting of my lading strap anchor on metal flooring elements of a railway flat car.
Figure 12:
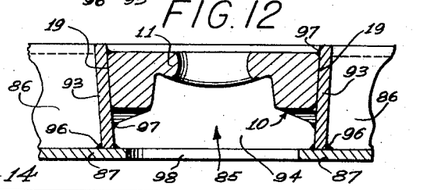
Fig. 12 is a fragmentary sectional view taken substantially on a line 12—12 of Fig. 11 in the direction of the arrows, and further illustrating the modified mounting of my anchor on metal flooring elements of a railway flat car.

An alternative mounting of my anchor on metal flooring of a railway car, as shown in Figs. 11 and 12, is advantageous when the lading straps are to extend longitudinally of the railway car. In this instance, spaced adaptor plates 93, utilized to support the anchor are positioned within an anchor recess 94 provided by the horizontal flanges 87 of the laterally extending flooring element 86. Such adaptor plates are somewhat similar in purpose to adaptor plates 88, except that its length is such that they extend between adjacent flooring elements, so as to engage the vertical web of each and be secured thereto by welds 96. The anchor 10 is then welded at 97 to oppositely disposed adaptor plates 93 with the end surfaces 19 utilized as contact areas. A suitable opening 98 is provided in flanges 87 under the tie post portion to provide for self cleaning of the anchor position, and to facilitate the attachment of lading straps to the anchor. As thus mounted, the tie post portion of the anchor extends laterally of the railway car, so that lading straps attached thereto will be directed longitudinally of the car for the securement of objects of lading. Rows of anchor positions may be located at desired intervals along the length of the car floor.

Figure 28:
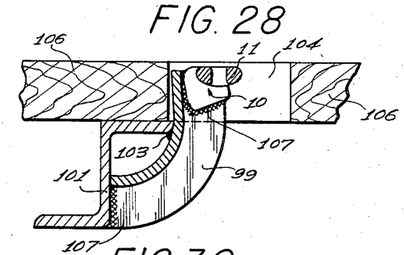
Fig. 28 is a fragmentary view, in section, showing the application of my lading strap anchor to a railway car floor stringer by a curved adaptor bracket.

In one manner of mounting my lading strap anchor with adaptor brackets to under-frame members of a railway car, as shown in Fig. 28, a curved channel type adaptor bracket 99 is utilized for securement of the anchor 10 to an underframe member such as a floor stringer 101. The adaptor bracket 99 is of relatively heavy channel section and curved to provide a generally L-shaped piece, as shown. It is secured to the floor stringer 101 by welds 102 and 103, so as to provide a rigid and strong support for the lading strap anchor. The upper portion of the adaptor bracket is disposed within a suitable anchor recess 104 in car floor 106. The lading strap anchor is secured between the channel flanges of the adaptor bracket by welds 107 with the anchor end surfaces 19 providing the contact areas, so that the tie post portion 11 is adjacent to the surface of the railway car floor.

This type of mounting of my lading strap anchor utilizing the curved adaptor bracket 99 may be made to other underframe members of a railway car such as, for example, to an end sill or to a crossbearer cover plate. Added strength and rigidity of the anchor mounting are afforded by the triangular arrangement resulting from securement of the adaptor bracket 99 at 103 to the horizontally extending top angle portion of the floor stringer and at 102 to the lower portion of the vertical web of the floor stringer.

Figure 32:
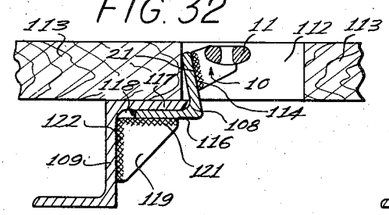
Fig. 32 is a fragmentary view, in section, showing the application of my lading strap anchor to a floor stringer of a railway car through a shaped adaptor bracket.

A further manner of mounting my lading strap anchor to an underframe member of a railway car by utilizing a shaped adaptor bracket is shown in Fig. 32, in which an L-shaped adaptor bracket 108 is secured directly to a floor stringer 109. An upper flange 111 of the adaptor bracket extends upwardly from the floor stringer and into a suitably shaped anchor recess 112 provided in the flooring 113 of the railway car. The anchor 10 is welded at 114 to the upper flange with its surfaces 21 in engagement with the flange, so that tie post portion 11 is adjacent to the surface of the car floor. A horizontally disposed lower flange 116 of the adaptor bracket is secured to the under surface of a horizontal top angle portion 117 of the floor stringer by welds 118. For added strength and rigidity at the anchor position, a gusset 119 of relatively heavy strap metal is positioned under the lower flange of the adaptor bracket and secured thereto and to the vertical web of the floor stringer by welds 121 and 122. This type of mounting utilizing adaptor bracket 108 may be similarly made to other railway car underframe members such as an end sill or crossbearer cover plate, thereby affording anchor points at desired locations throughout the railway car floor.

Figure 33:
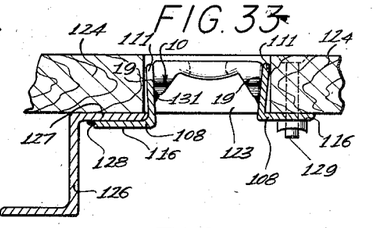
Fig. 33 is a fragmentary view, in section, of an alternative manner of mounting my anchor on a railway car floor stringer utilizing shaped adaptor brackets secured to the floor stringer and to the railway car flooring.

An alternative mounting for my lading strap anchor utilizing L-shaped brackets 108 is shown in Fig. 33, in which mounting the reinforcing gusset 119 is omitted and an additional L-shaped adaptor bracket is employed. In a suitably shaped anchor recess 123 provided in the car flooring 124 adjacent to floor stringer 126, the adaptor bracket 108 is secured at its lower flange 116 by welds 128 to a horizontal top portion 127 of the floor stringer with the upper flange 111 of the adaptor bracket extending into the anchor recess. Oppositely disposed with respect to the adaptor bracket 108 is a second adaptor bracket 108 having its lower flange 116 extending under and being secured to the car flooring by fastening means such as a bolt 129, and having its upper flange 111 extending upwardly into the anchor recess. The anchor 10 is secured at opposite end surfaces 19 to each of the upper flanges 111 of the adaptor brackets by welds 131, so that the anchor tie post portion is adjacent to the surface of the railway car floor. The two manners of mounting shown in Figs. 32 and 33 are of advantage when it is desired to employ anchors affixed to the same underframe member of a railway car with the tie post portions extending perpendicularly to each other.

Figure 29:
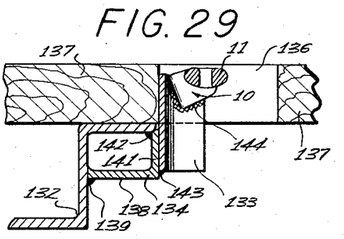
Fig. 29 is a fragmentary view, in section, showing the securement of my anchor to a floor stringer of a railway car by the combination of a U-strap support and an adaptor bracket.

My disclosed lading strap anchor may be utilized with both a U-strap support and shaped adaptor brackets. Thus, in the type of mounting shown in Fig. 29, the anchor 10 is mounted on a floor stringer 132 by means including a U-strap support 133 and an L-shaped adaptor bracket 134, both of these being made of relatively heavy strap metal and being disposed within an anchor recess 136 provided in wooden flooring elements 137 adjacent to the floor stringer. The adaptor bracket is secured at its lower flange 138 by welds 139 to the vertical web of the floor stringer and secured at its upper flange 141 by welds 142 to the horizontal top flange portion of the floor stringer. The box section provided by such angular arrangement imparts considerable strength and rigidity at the anchor position. The U-strap support 133 is welded at 143 to the upper flange of the adaptor bracket with the U-strap support extending upwardly into the anchor recess. The lading strap anchor is secured at its end surfaces 19 to the U-strap support by welds 144, so that the tie post portion 11 is adjacent to the surface of the railway car floor. This mounting may also be employed with other underframe members of a railway car including end sills and crossbearer cover plates so as to provide adequate distribution of the anchor positions.

Figure 30:
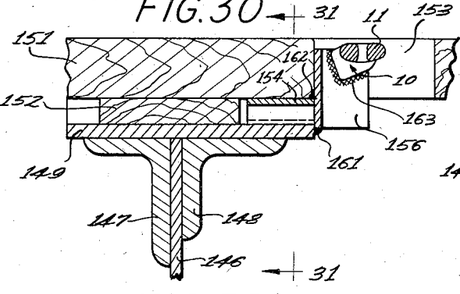
Fig. 30 is a fragmentary view, in section, illustrating the mounting of my lading strap anchor on a center sill cover plate of a railway car by a U-strap support together with a suitable adaptor bracket.
Figure 31:
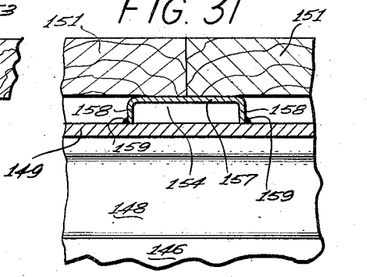
Fig. 31 is a fragmentary sectional view taken substantially on a line 31—31 of Fig. 30, in the direction of the arrows, and further illustrating the application of my anchor to a center sill cover plate.

Another manner of mounting of my lading strap anchor employing both a U-strap support and a shaped adaptor piece is shown in Figs. 30 and 31. In this instance, the anchor is affixed to a railway car center sill, which center sill comprises a center sill center web 146 secured between top angles 147 and 148 and carrying a center sill cover plate 149. Wood flooring elements 151 are supported on and spaced from the center sill cover plate by a wood spacer strip 152, the flooring elements having therein a suitably shaped anchor recess 153 for reception of the anchor and its U-strap support. An inverted and substantially U-shaped adaptor piece 154 of relatively heavy strap metal, employed to impart rigidity and strength at the anchor position, has a horizontal shelf portion 157 with downwardly disposed end flanges 158 secured to the center sill cover plate by welds 159, the height of the end flanges being substantially the same as the thickness of spacer strip 152. The adaptor piece 154 is preferably mounted on the center sill cover plate at a juncture of the flooring elements, so as to prevent the railway car floor from being unduly weakened at this point. The U-strap support 156, of relatively heavy strap metal, is positioned within the anchor recess with its lower edge secured to the center sill cover plate by welds 161. The shelf portion of the adaptor piece is secured by welds 162 to the U-strap support, thus providing a rectangular connection that is strong and rigid. The anchor 10 is secured at its end surfaces 19 within the U-strap support by welds 163 so that the tie post portion 11 is adjacent to the surface of the railway car floor. This mounting may be used with other railway car underframe members such as, for example, at a side sill reinforcement.

Figure 34:
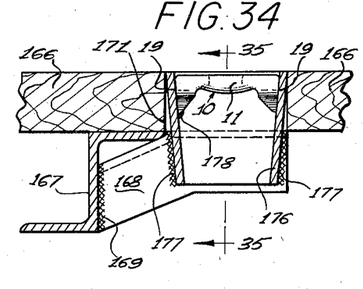
Fig. 34 is a fragmentary view, in section, of another manner of mounting my anchor on a floor stringer of a railway car through a U-strap support and an adaptor, in addition to being secured to the flooring bracket.
Figure 35:
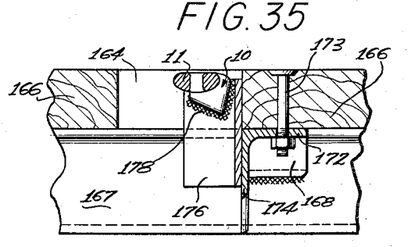
Fig. 35 is a fragmentary sectional view taken substantially on a line 35—35 of Fig. 34, in the direction of the arrows, further showing the securement of my anchor to a railway car floor stringer.

A further type of mounting for my lading strap anchor employing both a U-strap support and a shaped adaptor bracket is illustrated in Figs. 34 and 35. In this mounting, an anchor recess 164 is provided in wood flooring elements 166 adjacent to a floor stringer 167. A bent angle adaptor bracket 168 has one end secured to the vertical web of the floor stringer, as by welds 169, and is also secured to the horizontal top angle portion of the floor stringer by weld 171. Since the adaptor bracket 168 is of L-shape in cross-section, its upper flange 172 is conveniently affixed to a floor element adjacent to the anchor recess as by bolt 173, thus further assuring rigid securement of the adaptor bracket to the railway car underframe and flooring. As thus arranged, a lower flange 174 of the adaptor bracket extends along a side of the anchor recess and, in effect, constitutes a bottom extension thereof. A U-strap support 176 is mounted within the anchor recess with its lower portion abutting against and secured by welds 177 to the lower flange 174 of the adaptor bracket. The anchor 10 is secured within the U-strap support at its end surfaces 19 by welds 178 so that the tie post portion 11 is adjacent to the surface of the railway car floor.

This type of mounting may be used with other underframe members of a railway car, such as an end sill or a crossbearer cover plate. It is of particular advantage when it is desired to provide an anchor position in which the tie post portion of the anchor is perpendicular to the underframe member to which it is secured, so that lading straps and ties extend from the anchor in a direction parallel to the supporting underframe member. Such a mounting, of course, may be employed in combination with those applications directed primarily to the securement of the lading strap anchor with its tie post portion parallel to the underframe member supporting the anchor.

Figure 6:
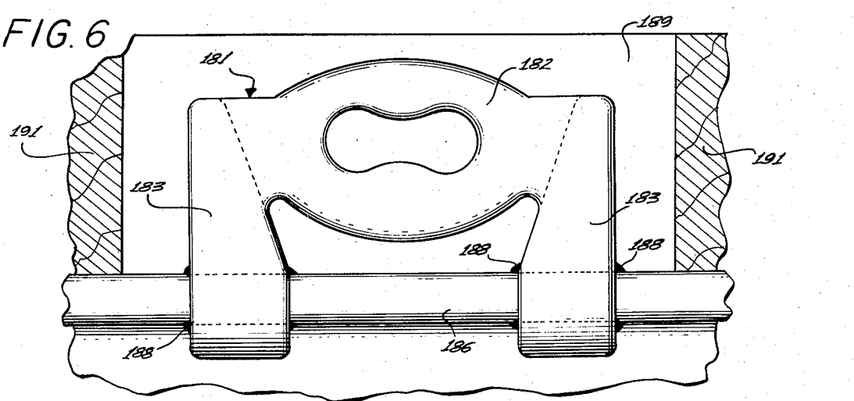
Fig. 6 is a fragmentary front elevational view showing a modified form of lading strap anchor embodying my invention, the view illustrating attachment of the anchor to a structural member of a railway freight car.
Figure 7:
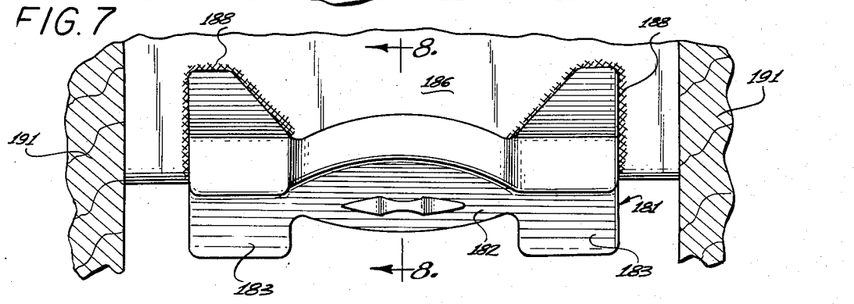
Fig. 7 is a fragmentary top view of the modified form of lading strap anchor shown in Fig. 6, and illustrating its attachment to a railway freight car.
Figure 8:
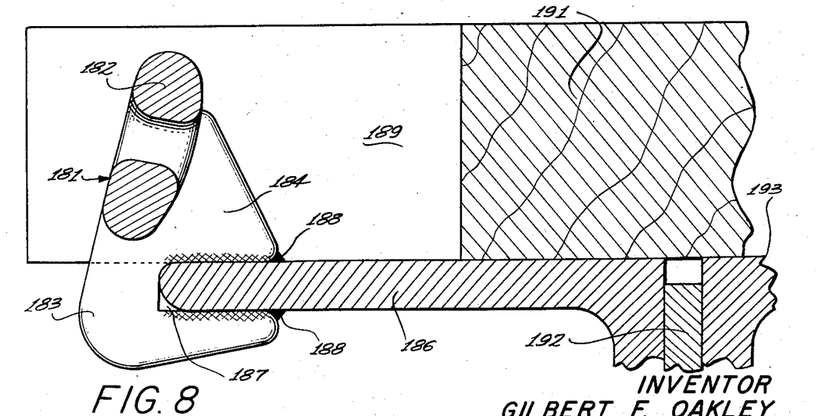
Fig. 8 is a fragmentary sectional view taken substantially on a line 8—8 of Fig. 7, in the direction of the arrows and further showing my modified lading strap anchor as applied to a structural member of a railway freight car.

Another type of mounting for a lading strap anchor embodying my invention is one employing a modified form of lading strap anchor for the purpose of providing a convenient and secure attachment of the anchor to certain of the underframe members of a railway car. As shown in Figs. 6, 7, and 8, such a lading strap anchor 181 has a tie post portion 182, similar to the previously described tie post portion 11, and integral wing portions 183 of a generally triangular end configuration as shown at 184 in Fig. 8. To facilitate a secure and rigid attachment of the anchor to a horizontal flange portion 186 or the like on an underframe member of a railway flat car, an elongated slot 187 is provided in each of the wing portions of the anchor 181 so as to receive the horizontal underframe flange portion 186 at a position at which the tie post portion 182 is spaced from the supporting structure. The elongated slots are of dimensions sufficient to receive the horizontal flange portion 186 to which anchor is secured by welds 188 extending around the slot of each wing portion. The tie post portion 182 of the lading strap anchor, as thus secured, projects upwardly from the underframe member and into an anchor recess 189 provided in wood flooring elements 191, the anchor recess exposing a sufficient area of the car underframe member for attachment of the anchor thereto. As shown in detail in Fig. 8 the horizontal flange portion 186 of the underframe member may be the top angle of a railway car center sill, side sill, or end sill, such structure in the illustrated adaptation, including a center web 192 and an oppositely disposed top angle 193. The lading strap anchor 181 is applicable also to other horizontal underframe members, such as the top flanges of floor stringers and the cover plates of car sills and the like.

Figure 16:
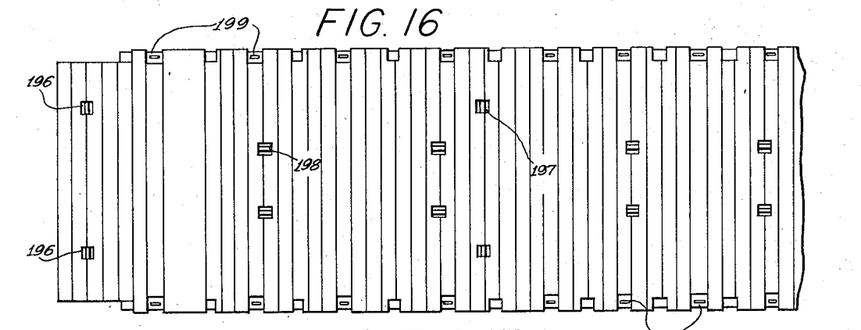
Fig. 16 is a top plan view of a portion of a railway flat car, the view indicating various positions on the floor area of the car at which my lading strap anchor may be conveniently and effectively applied.
Figure 17:
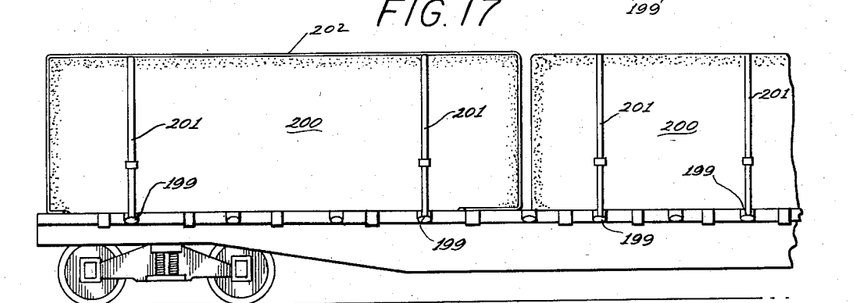
Fig. 17 is a side elevational view of a portion of a railway flat car further illustrating positions of application of my improved anchor to this type of railway car, and showing objects of lading secured by lading straps engaging the anchor at anchor points on and along the car floor.

My lading strap anchor 10 may be mounted at various positions on the floor area of a railway flat car, as shown in Figs. 16 and 17. In a standard railway flat car construction, the underframe elements particularly adapted for supporting an anchor mounting which utilizes my anchor include longitudinally extending members such as side sills on either side of the car, a center sill along the center of the car, and floor stringers located at spaced positions between the center still and the side sills. Also suitable for the mounting of my anchor are such laterally extending members as end sills across each end of the car, bolsters located near each end, and crossbearers at spaced positions between the bolsters. Referring now to Fig. 16, the lading strap anchor may be used in the various types of mountings that have been described on an end sill, as shown at 196, or on a crossbearer as shown at 197, with a desired number of such anchor positions extending laterally of the railway car at spaced intervals along the particular underframe member. Also, my anchor may be supported on either side of the center sill, as shown at 198, or on either of the side sills, as shown at 199, anchor positions at these locations being aligned longitudinally of the car. Utilization of my anchor is shown in Fig. 17, in which objects of lading 200 are maintained in place on a railway flat car by lading straps 201 attached to anchors mounted on the railway car side sills, as well as by longitudinally extending lading straps, such as 202 secured to anchors on the end sill and crossbearers.

The versatility and adaptability of my lading strap anchor thus enables anchor positions to be provided throughout the floor area of the railway car. While my anchor is preferably attached to underframe members, it may also be secured to railway car metal flooring, as has been described. It is of advantage, however, in positioning the lading strap anchor to maintain the tie post portion adjacent to the surface of the railway car floor for convenient and rapid attachment of lading straps to the anchor and to maintain the lading straps in good condition without kinks, twists, or injurious bends. Wherever possible, an anchor recess provided in the railway car floor is preferably located at a juncture of the flooring planks or elements so that the recess does not unduly weaken the floor. The anchor recess is, of course, of suitable shape and of proper dimensions in all cases to accommodate my anchor together with auxiliary fittings such as U-strap supports and adaptor brackets that may be used with it in mounting the lading strap anchor on the railway car. Such anchor recess is provided either partially over or adjacent to the particular supporting underframe member to which the anchor is to be secured, so as to expose a portion of such member for effective mounting of the anchor thereon. When the anchor recess is open at the bottom, attachment of lading straps to the anchor is facilitated and the anchor recess is normally maintained in a clean and usable condition at all times.

The U-strap supports and the adaptor brackets that have been described for use with my universal lading strap anchor are preferably pressings or rolled sections of relatively heavy metal for adequate strength and rigidity. A suitable means of securing the lading strap anchor to the railway car structure, including its underframe members, is by welding, as this is relatively conveniently and inexpensively done and results in a secure and rigid joint. As the underframe members which support the lading strap anchor are for the most part conventional and standard for railway freight car construction, my improved anchor may be used either for installation in existing car structures or for railway cars to be designed and built.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. An anchor for lading straps and the like for use on railway freight cars and comprising, in combination, a tie post portion of generally symmetrical shape relative to a plane extending longitudinally thereof and of a length along said plane which is greater than its width in a direction normal to said plane, said tie post portion being of a thickness less than its width and having longitudinally convex edges extending along opposite sides of said plane, said tie post portion also having a longitudinally convex surface and a relatively flat surface providing faces in opposed relationship extending between the said convex edges, wing portions of similar shape to one another integral with opposite longitudinal ends of the tie post portion and each having thereon three mounting surfaces which are in angular relationship to one another, two of said mounting surfaces on each wing portion being in acute angular relationship to the said relatively flat surface of the tie post portion and each spaced from the tie post portion in a direction transverse to the length thereof, and the third mounting surface on each wing portion adjoining each of said two surfaces and constituting an end surface of the anchor.

2. An anchor for lading straps and the like for use on railway freight cars and comprising, in combination, a tie post portion of generally symmetrical shape relative to a plane extending longitudinally thereof and of a length along said plane which is greater than its width in a direction normal to said plane, said tie post portion being of a thickness less than its width and having longitudinally convex edges extending longitudinally of the tie post portion on opposite sides of said plane, said tie post portion also having a longitudinally convex surface and a relatively flat surface providing faces in opposed and spaced relationship to one another and extending between the said convex edges, wing portions of similar shape to one another integral with opposite longitudinal ends of the tie post portion and having end surfaces in opposed relationship to one another and spaced therefrom in a direction longitudinal of the tie post portion, said wing portions also having side faces in substantially flush relationship to the said relatively flat surface of the tie post portion, and said wing portions having mounting surfaces aligned with one another longitudinally of the tie post portion and extending in acute angular relationship to the said relatively flat surface of the tie post portion, said mounting surfaces also being in a plane spaced from the tie post portion in directions normal to the planes of the mounting surfaces.

3. An anchor for lading straps and the like as defined in claim 2, and wherein one of said mounting surfaces on each wing portion constitutes one side of an open slot extending into the wing portion.

4. An anchor for lading straps and the like adapted for use on a railway car, said anchor comprising a central tie post portion of oblong sectional shape in a direction lateral to the length thereof and having on its opposite ends shaped wing portions projecting generally perpendicular to the tie post portion, said wing portions each having thereon three angularly related mounting surfaces for separate engagement with structural elements of a railway car, which mounting surfaces are spaced from said tie post portion in directions which are normal to the respective surfaces, said wing portions having a general trapezium configuration as viewed endwise of the tie post portion and a general triangular side configuration as viewed laterally of the tie post portion.

References Cited in the file of this patent

UNITED STATES PATENTS

| | | |
|---|---|---|
| 2,226,667 | Love | Dec. 31, 1940 |
| 2,449,300 | Jones | Sept. 14, 1948 |
| 2,481,598 | Jones | Sept. 13, 1949 |
| 2,587,882 | Oakley | Mar. 4, 1952 |
| 2,596,855 | Johnson | May 13, 1952 |
| 2,655,874 | Swann | Oct. 20, 1953 |
| 2,716,382 | Johnson | Aug. 3, 1955 |

OTHER REFERENCES

MacLean-Fogg Lock Nut Co., Dwg. No. 152, dated September 29, 1952, publication reference (1 sheet).